US011988459B2

(12) United States Patent
Pack et al.

(10) Patent No.: US 11,988,459 B2
(45) Date of Patent: May 21, 2024

(54) PLATE-AND-FIN HEAT EXCHANGER WITH FINS HAVING ONE OR MORE BENDING POINTS

(71) Applicant: GM Global Technology Operations LLC, Detroit, MI (US)

(72) Inventors: Seongchan Pack, West Bloomfield Township, MI (US); Eric Allen Weir, South Lyon, MI (US); Luca Peschini, Cesano Maderno (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 39 days.

(21) Appl. No.: 17/844,988

(22) Filed: Jun. 21, 2022

(65) Prior Publication Data

US 2023/0408204 A1 Dec. 21, 2023

(51) Int. Cl.

| | |
|---|---|
| ***F28D 9/00*** | (2006.01) |
| ***F02B 29/04*** | (2006.01) |
| ***F28F 3/02*** | (2006.01) |
| ***F28F 21/08*** | (2006.01) |

(52) U.S. Cl.

CPC ............ *F28D 9/0062* (2013.01); *F28F 3/025* (2013.01); *F28F 21/081* (2013.01); *F02B 29/0456* (2013.01); *F02B 29/0462* (2013.01); *F28F 2265/00* (2013.01); *F28F 2275/04* (2013.01)

(58) Field of Classification Search

CPC ...... F28F 3/025; F28F 1/40; F28F 3/02; F28F 3/027; F28D 9/0062

See application file for complete search history.

(56) References Cited

U.S. PATENT DOCUMENTS

| | | | | |
|---|---|---|---|---|
| 6,921,584 B2 * | 7/2005 | Syslak | C22C 21/02 | 165/905 |
| 2004/0050541 A1 * | 3/2004 | Higashiyama | F28F 3/025 | 165/168 |
| 2005/0034848 A1 * | 2/2005 | Ueda | F28D 1/0535 | 165/177 |
| 2013/0045411 A1 * | 2/2013 | Bauer | F28F 3/025 | 429/120 |
| 2013/0213623 A1 * | 8/2013 | Perocchio | F28F 1/022 | 165/170 |
| 2014/0290920 A1 * | 10/2014 | Ouradnik | F28D 1/0366 | 165/140 |

FOREIGN PATENT DOCUMENTS

| | | | |
|---|---|---|---|
| DE | 102012204178 B3 * | 3/2013 | B01J 19/0093 |
| EP | 591693 A1 * | 4/1994 | B21C 37/151 |
| EP | 1748270 A1 * | 1/2007 | B23K 1/0012 |
| JP | 2006132904 A * | 5/2006 | F28F 3/025 |

* cited by examiner

*Primary Examiner* — Jianying C Atkisson

*Assistant Examiner* — For K Ling

(74) *Attorney, Agent, or Firm* — Vivacqua Crane, PLLC

(57) ABSTRACT

A core assembly for a plate-and-fin heat exchanger includes a pair of core plates and a heat-absorbing member disposed within the passageway that secures the pair of core plates together. The heat-absorbing member defines a plurality of fins that each include one or more bending points, and each bending point creates two points of contact between a core plate and the heat-absorbing member.

20 Claims, 4 Drawing Sheets

PLATE-AND-FIN HEAT EXCHANGER WITH FINS HAVING ONE OR MORE BENDING POINTS

INTRODUCTION

The present disclosure relates to a plate-and-fin heat exchanger including a core assembly having one or more pairs of core plates secured together by a plurality of fins. Each fin includes one or more bending points that create two points of contact with one of the core plates.

Plate-and-fin heat exchangers are used in a wide variety of applications such as, but not limited to, air conditioning and refrigeration systems. A plate-and-fin heat exchanger is constructed of metal fins that are joined to flat plates using a brazing process. The fins have the dual purpose of holding the plates together as well for heat transfer between two fluids.

One exemplary type of plate-and-fin heat exchanger is a charge air cooler (CAC) for a turbocharged engine, which may also be referred to as an intercooler. The charge air cooler is located between a turbocharger and an intake manifold of the turbocharged engine in a vehicle. The purpose of the charge air cooler is to reduce the air inlet temperature to the engine, which in turn improves engine efficiency. A charge air cooler tends to experience high thermal transients, especially at the air inlet as well as the coolant outlet. It is to be appreciated that high thermal transients create expansion and contraction between the plate and the fins of the heat exchanger, which may result in cracks forming in the braze joints that secure the plate to the fins.

Thus, while current plate-and-fin heat exchangers achieve their intended purpose, there is a need in the art for an improved plate-and-fin heat exchanger having a more robust interface between the plate and the fins.

SUMMARY

According to several aspects, a core assembly for a plate-and-fin heat exchanger is disclosed. The core assembly includes a pair of core plates defining a passageway and a heat-absorbing member disposed within the passageway defined by the pair of core plates. The heat-absorbing member secures the pair of core plates together and defines a plurality of fins that each include one or more bending points, and each bending point create two points of contact between a core plate and the heat-absorbing member.

In another aspect, an individual fin of the plurality of fins defines a first side that extends towards a respective core plate that the individual fin is secured to and a second side that extends away from the respective core plate the individual fin is secured to.

In still another aspect, the one or more bending points is disposed between the first side and the second side of the individual fin.

In yet another aspect, the one or more bending points include a rounded profile defining a radius.

In another aspect, the radius of the one or more bending points ranges from about ten micrometers to about one hundred micrometers.

In still another aspect, the heat-absorbing member is secured to the pair of core plates by a braze joint.

In yet another aspect, a thickness of the braze joint is measured from a crest of the one or more bending points and a surface of a respective core plate a respective fin is secured to.

In another aspect, the braze joint defines a thickness of less than a hundred micrometers.

In still another aspect, the braze joint is constructed of an aluminum silicon (Al—Si) alloy, stainless steel, brass, copper, copper-silver alloys, nickel, and nickel-based alloys.

In yet another aspect, an individual fin includes more than one bending point.

In another aspect, the individual fin includes three bending points that are positioned directly adjacent to one another.

In still another aspect, each of the one or more bending points are defined by an edge.

In yet another aspect, each edge of the one or more bending points cooperate with one another to define a trapezoidal toothed profile.

In an aspect, a plate-and-fin heat exchanger for a vehicle is disclosed and includes an inlet header, an outlet header, and a core assembly fluidly connected to the inlet header and the outlet header. The core assembly comprises a pair of core plates that define a passageway and a heat-absorbing member disposed within the passageway defined by the pair of core plates, where the heat-absorbing member secures the pair of core plates together and defines a plurality of fins that each include one or more bending points. Each bending point create two points of contact between a core plate and the heat-absorbing member.

In still another aspect, an individual fin of the plurality of fins defines a first side that extends towards a respective core plate that the individual fin is secured to and a second side that extends away from the respective core plate the individual fin is secured to.

In yet another aspect, the one or more bending points is disposed between the first side and the second side of the individual fin.

In another aspect, the one or more bending points includes a rounded profile defining a radius.

In still another aspect, the heat-absorbing member is secured to the pair of core plates by a braze joint.

In yet another aspect, a thickness of the braze joint is measured from a crest of the one or more bending points and a surface of a respective core plate a respective fin is secured to.

In another aspect, the plate-and-fin heat exchanger is a charge air cooler for the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
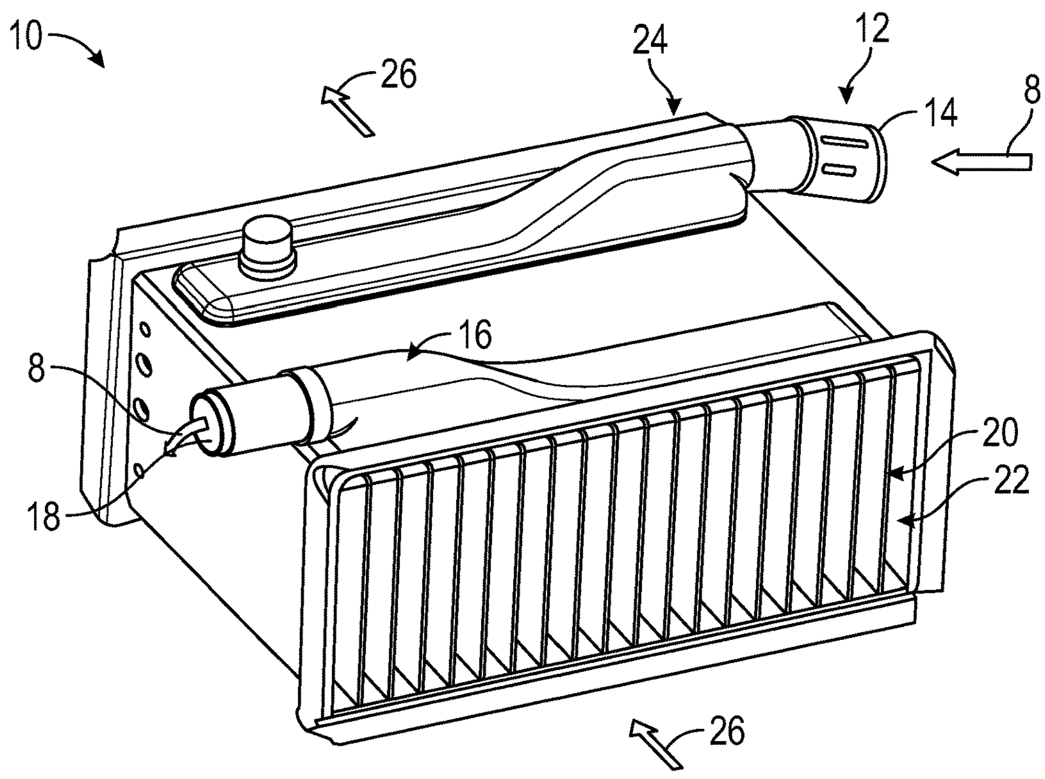
FIG. 1 is a perspective view of an exemplary plate-and-fin heat exchanger including an inlet header, an outlet header, and a core assembly, according to an exemplary embodiment.

Referring to FIG. 1, an exemplary plate-and-fin heat exchanger 10 is illustrated. The plate-and-fin heat exchanger 10 includes an inlet header 12 including an inlet opening 14, an outlet header 16 including an outlet opening 18, and a core assembly 20. The inlet opening 14 receives a working fluid 8 that is distributed through the core assembly 20 of the plate-and-fin heat exchanger 10 and exits the plate-and-fin heat exchanger 10 through the outlet opening 18. The core assembly 20 is fluidly connected to the inlet header 12 and the outlet header 16 and includes an air inlet side 22 and an air outlet side 24. Air 26 enters the core assembly 20 through the air inlet side 22 and exits the core assembly 20 through the air outlet side 24, and the working fluid 8 draws heat from air 26 flowing through the core assembly 20. In one non-limiting example, the plate-and-fin heat exchanger is a charge air cooler (CAC) that reduces an air inlet temperature of a turbocharged engine for a vehicle, and the working fluid 8 is an engine coolant. However, it is to be appreciated that FIG. 1 is merely exemplary in nature and the disclosed plate-and-fin heat exchanger 10 is not limited to specific application. For example, in another embodiment, the plate-and-fin heat exchanger 10 may be an air-cooled heat exchanger where the working fluid is air.

Figure 2:
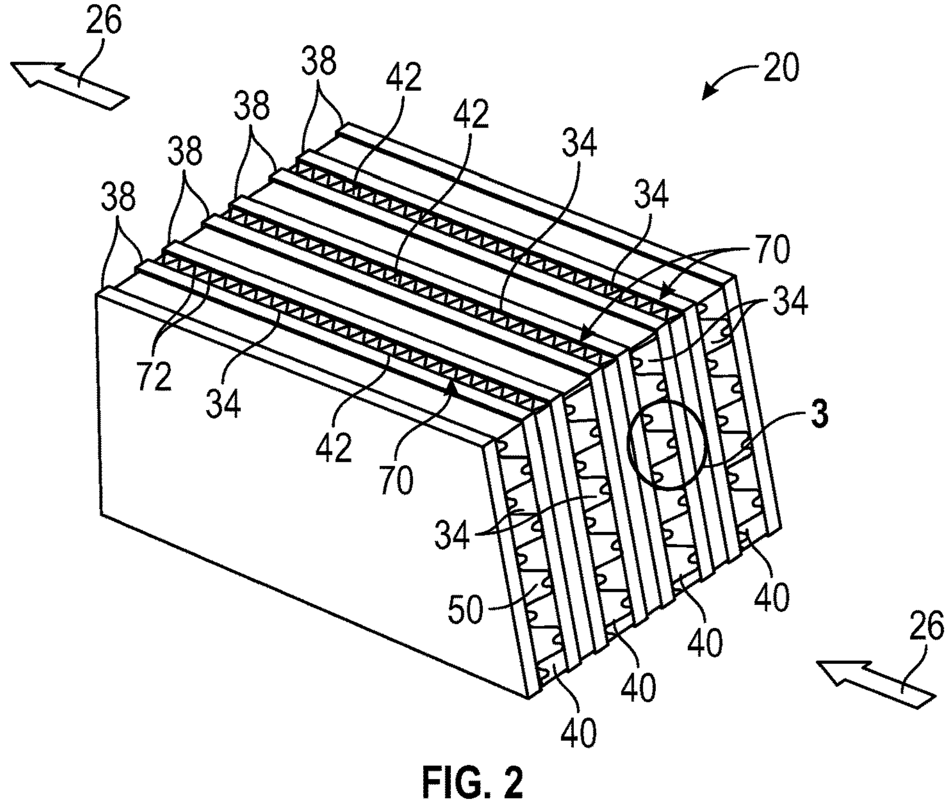
FIG. 2 is a perspective view of the core assembly shown in FIG. 1, according to an exemplary embodiment.
Figure 3:
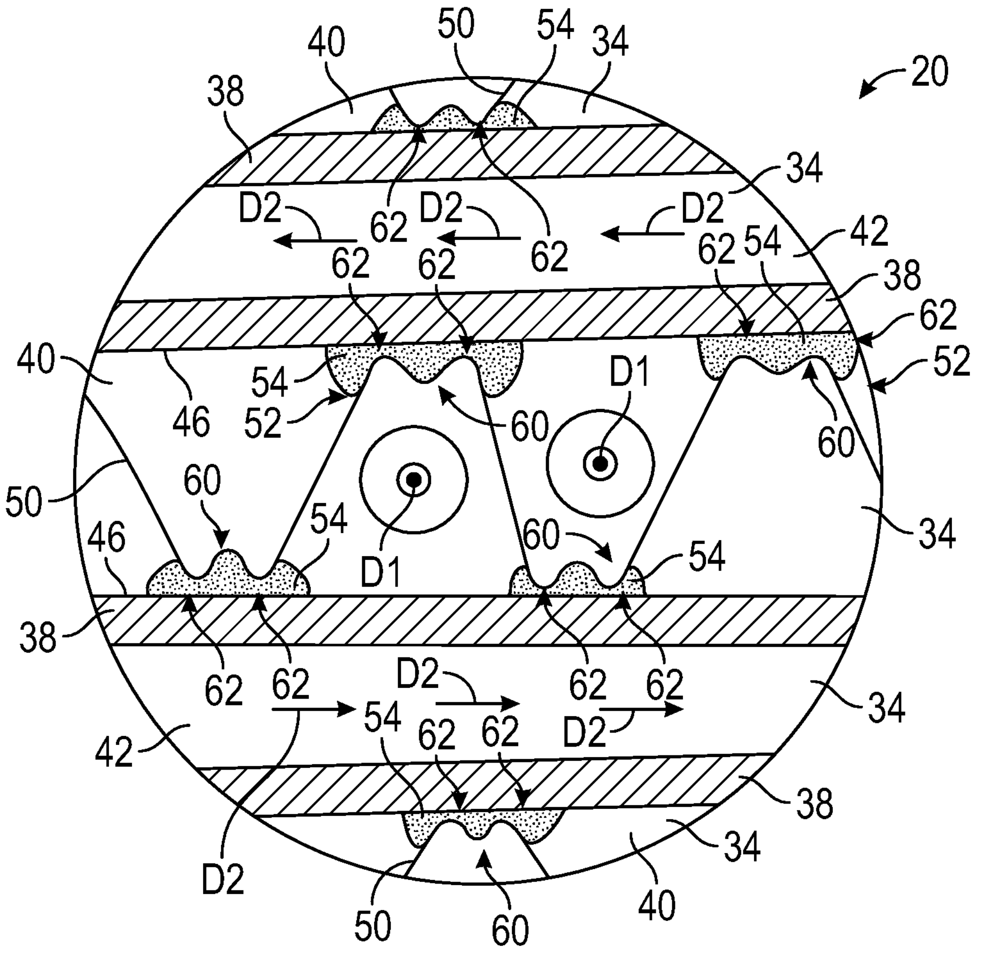
FIG. 3 is an enlarged view of Area 3 shown in FIG. 2, where the core assembly includes a pair of core plates and a plurality of fins that secure the core plates together, according to an exemplary embodiment.

FIG. 2 illustrates the core assembly 20 and FIG. 3 is an enlarged view of Area 3 in FIG. 2. Referring to FIGS. 1-3, the core assembly 20 is defined by a plurality of alternating flow passageways 34 defined by one or more pairs of core plates 38. The core assembly 20 includes one or more first flow passageways 40 for receiving a first fluid, which is the air 26, and one or more second flow passageways 42 for receiving a second fluid, which is the working fluid 8. The first fluid flows in a first direction D1 (seen in FIG. 3) and the second fluid flows in a second direction D2 (seen in FIG. 3), where the first direction D1 is perpendicular with respect to the second direction D2.

Referring to FIGS. 2 and 3, the first flow passageways 40 are defined by opposing surfaces 46 (FIG. 3) of the pair of core plates 38. A first heat-absorbing member 50 that is formed into a first plurality of fins 52 is disposed within each first flow passageway 40. The first plurality of fins 52 draw heat from the air 26 that flows through the first flow passageways 40. The first plurality of fins 52 also secure the pair of core plates 38 to one another. The first plurality of fins 52 are each individually attached to the opposing surfaces 46 of a respective core plate 38 by a joint 54 (seen in FIG. 3). Each fin 52 of the plurality of fins 52 includes one or more bending points 60, where each bending point creates two points of contact 62 between a respective core plate 38 and the heat-absorbing member 50. Referring specifically to FIG. 2, a second heat absorbing member 70 that is formed into a second plurality of fins 72 is disposed within each second flow passageway 42 of the core assembly Although the figures illustrate the first plurality of fins 52 as including the one or more bending points 60, it is to be appreciated in embodiments the second plurality of fins 72 may include one or more bending points as well. Furthermore, although the figures illustrate each fin 52 having a bending point it is to be appreciated in some embodiments not all of the fins 52 of the heat-absorbing member 50 include a bending point 60.

Figure 4:
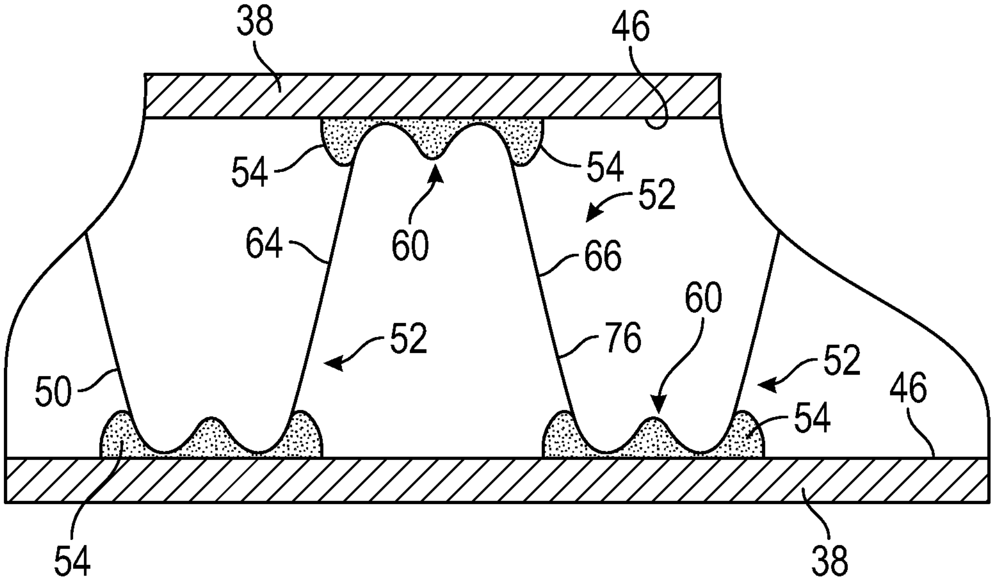
FIG. 4 is an enlarged view of the fins shown in FIG. 3, where the fins each include one or more bending points, according to an exemplary embodiment.
Figure 5:
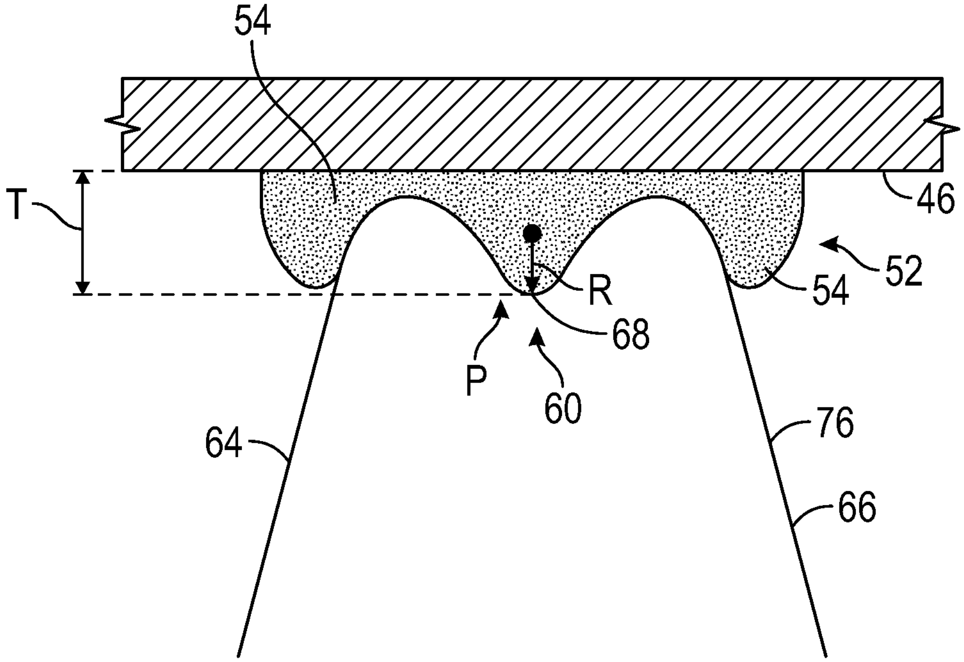
FIG. 5 is an enlarged view of an individual fin shown in FIG. 4 and a joint that secures the individual fin to a respective core plate, according to an exemplary embodiment.
Figure 6:
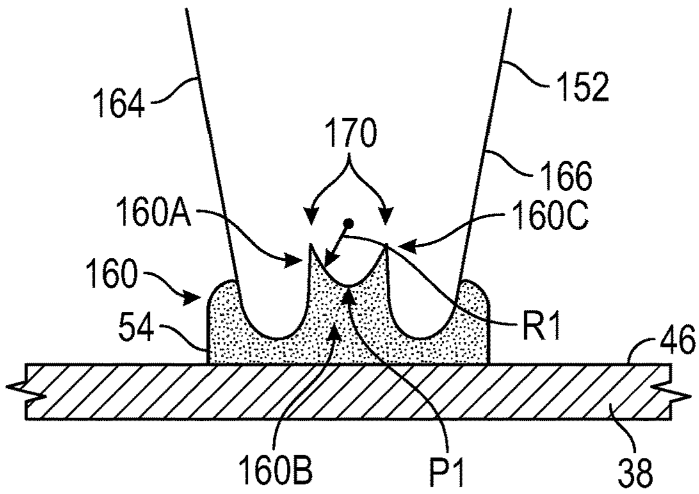
FIG. 6 is another embodiment of an individual fin, where the fin includes more than one bending point, according to an exemplary embodiment.
Figure 7:
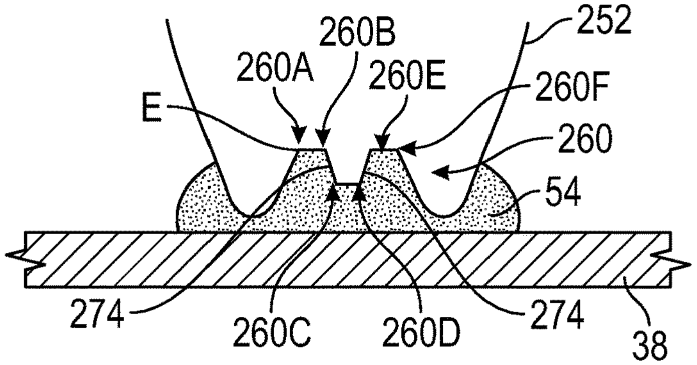
FIG. 7 is yet another embodiment of an individual fin, where the fin includes a plurality of bending points that cooperate to create a trapezoidal toothed profile, according to an exemplary embodiment.

FIG. 4 is an enlarged view of the first plurality of fins 52 attached to the opposing surfaces 46 of a pair of core plates 38, and FIG. 5 is an enlarged view of the bending point 60 of an individual fin 52. Referring to FIG. 4, each fin 52 defines a first side 64 that extends towards the respective core plate 38 that the individual fin 52 is secured to and a second side 66 that extends away from the respective core plate 38 the individual fin 52 is secured to. The bending point 60 is disposed between the first side 64 and the second side 66 of the fin 52. Referring to FIGS. 4-5, in one non-limiting embodiment the bending point 60 includes a rounded profile P defining a radius R. In one embodiment, the radius R of the bending point 60 may range from about ten micrometers to about a hundred micrometers (10-100 μm). Although FIGS. 4 and 5 illustrate each fin 52 as including a single bending point 60 that includes a rounded profile P, it is to be appreciated that other configurations may be included as well, which are shown in FIGS. 6-7.

Referring to both FIGS. 4 and 5, each joint 54 secures a respective fin 52 to a respective core plate 38. The joint 54 is a braze joint constructed of brazing alloys such as, for example, an aluminum silicon (Al—Si) alloy, stainless steel, brass, copper, copper-silver alloys, nickel, and nickel-based alloys. The bending point 60 results in a finer crystalline microstructure of the joint 54 during a brazing process that joins the fins 52 to the respective core plates 38. It is to be appreciated that a finer crystalline microstructure results in improved thermal fatigue characteristics and mechanical properties such as, but not limited to, tensile strength and fatigue strength of a braze joint. The finer crystalline microstructure enhances the overall thermal fatigue of the plate-and-fin heat exchanger 10 (FIG. 1).

Continuing to refer to FIGS. 4 and 5, the core plates 38 and the fins 52 are constructed of a metal alloy such as, but not limited to, aluminum and aluminum alloys, stainless steel, brass, copper, copper-silver alloys, nickel, and nickel-based alloys. In one non-limiting embodiment, the surface 46 of the respective core plate 38, an outer surface 76 of the fins 52, or both the surface 46 of the respective core plate 38 and the outer surface 76 of the fins 52 include one of more of the following properties: a surface roughness average Ra ranging from about two micrometers to about seven micrometers, an average maximum height Rz ranging from about fifteen micrometers to about twenty five micrometers, a maximum profile peak height Rp ranging from about twelve micrometers to about twenty micrometers, and a maximum profile valley depth Rv ranging from about three micrometers to about five micrometers.

Referring specifically to FIG. 5, a thickness T of the joint 54 is measured from a crest 68 of the bending point 60 and the surface 46 of the respective core plate 38 the fin 52 is secured to. In one non-limiting embodiment, the thickness T of the joint 54 is less than about 100 micrometers (100 μm).

FIG. 6 is an alternative embodiment of an individual fin 152 including more than one bending point 160. Specifically, in the embodiment as shown in FIG. 6, the individual fin 152 includes three bending points 160 that are positioned directly adjacent to one another. In the embodiment as shown in FIG. 6, a first bending point 160A is disposed directly adjacent to the first side 164 of the individual fin 152. A second bending point 1606 is disposed between the first bending point 160A and a third bending point 160C. The third bending point 160C is disposed between the second bending point 1606 and the second side 66 of the fin 152. The first bending point 160A and the third bending point 160C both define respective peaks 170 that point in a direction away from the respective plate 38 that the individual fin 152 is secured to. The second bending point 160B includes a rounded profile P1 defining a radius R1.

FIG. 7 is another embodiment of an individual fin 252 including six bending points 260 that are positioned directly adjacent to one another. In the example as shown in FIG. 7, each bending point 260 is defined by an edge E, where the edges E cooperate with one another to define a trapezoidal toothed profile. In the embodiment as shown, the individual fin 252 includes six individual bending points 260A, 260B, 260C, 260D, 260E, 260F, however, it is to be appreciated that more or fewer bending points 260 may be used as well. Furthermore, although FIG. 7 illustrates a trapezoidal toothed profile, it is to be appreciated that other profiles may be used as well. For example, in another embodiment, the sides 274 of the toothed trapezoidal profile may include a curved profile instead of the straight profile as shown in FIG. 7.

Figure 8:
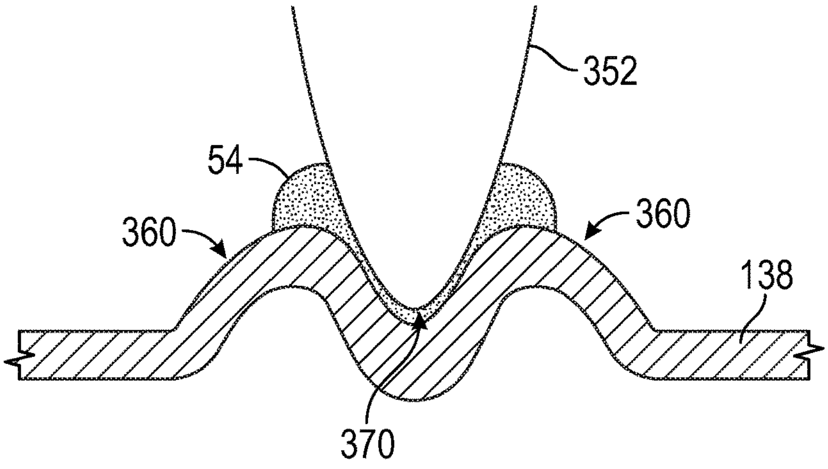
FIG. 8 illustrates one of the core plates including two bending points, according to an exemplary embodiment.

It is to be appreciated that the disclosed bending points 60 are not limited to the fins 52 and may be used in other areas of the core assembly (FIG. 2) as well. For example, FIG. 8 illustrates an individual fin 352 without a bending point 60 and a respective core plate 138 that the individual fin 352 is secured to. In the embodiment as shown in FIG. 8, the core plate 138 defines two bending points 360 and the individual fin 352 defines a rounded end 370. The rounded end 370 of the individual fin 352 contacts the bending points 360 of the core plate 138.

Referring generally to the figures, the disclosed plate-and-fin heat exchanger provides various technical effects and benefits. Specifically, the bending point results in improved heat transfer during liquid-solid solidification of the braze joint that secures the fins to the core plates. It is to be appreciated that the inclusion of one or more bending points in either the fins or the core plates may result in finer microstructure of the resulting braze joints. A finer microstructure results in improved mechanical properties and thermal fatigue characteristics of the brazed joint. This in turn results in enhanced durability and reduced warranty claims of the plate-and-fin heat exchanger.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A core assembly for a plate-and-fin heat exchanger, the core assembly comprising:

a pair of core plates defining a passageway; and a heat-absorbing member disposed within the passageway defined by the pair of core plates, wherein the heat-absorbing member secures the pair of core plates together and defines a plurality of fins that each include a plurality of bending points, and each bending point is between two points of contact between a core plate and the heat-absorbing member, and wherein each of the plurality of bending points is an edge, and wherein each edge of the plurality of bending points cooperates with one another to define a trapezoidal toothed profile.

2. The core assembly of claim 1, wherein an individual fin of the plurality of fins defines a first side that extends towards a respective core plate that the individual fin is secured to and a second side that extends away from the respective core plate the individual fin is secured to.

3. The core assembly of claim 2, wherein the plurality of bending points are disposed between the first side and the second side of the individual fin.

4. The core assembly of claim 1, wherein the heat-absorbing member is secured to the pair of core plates by a braze joint.

5. The core assembly of claim 4, wherein a thickness of the braze joint is measured from a crest of one of the plurality of bending points and a surface of a respective core plate a respective fin is secured to.

6. The core assembly of claim 4, wherein the braze joint defines a thickness of less than a hundred micrometers.

7. The core assembly of claim 4, wherein the braze joint is constructed of one or more of the following: an aluminum silicon (Al—Si) alloy, stainless steel, brass, copper, copper-silver alloys, nickel, and nickel-based alloys.

8. The core assembly of claim 1, wherein an outer surface of the plurality of fins includes a surface roughness average ranging from about two micrometers to about seven micrometers.

9. The core assembly of claim 1, wherein the passageway is defined by opposing surfaces of the pair of core plates, and wherein the opposing surfaces of both of the pair of core plates include a surface roughness average ranging from about two micrometers to about seven micrometers.

10. A plate-and-fin heat exchanger for a vehicle, comprising:

an inlet header;

an outlet header;

a core assembly fluidly connected to the inlet header and the outlet header, wherein the core assembly comprises:

a pair of core plates that define a passageway; and a heat-absorbing member disposed within the passageway defined by the pair of core plates, wherein the heat-absorbing member secures the pair of core plates together and defines a plurality of fins that each include a plurality of bending points, and each bending point is between two points of contact between a core plate and the heat-absorbing member, and wherein each of the plurality of bending points is an edge, and wherein each edge of the plurality of bending points cooperates with one another to define a trapezoidal toothed profile.

11. The plate-and-fin heat exchanger of claim 10, wherein an individual fin of the plurality of fins defines a first side that extends towards a respective core plate that the individual fin is secured to and a second side that extends away from the respective core plate the individual fin is secured to.

12. The plate-and-fin heat exchanger of claim 11, wherein the plurality of bending points are disposed between the first side and the second side of the individual fin.

13. The plate-and-fin heat exchanger of claim 10, wherein the heat-absorbing member is secured to the pair of core plates by a braze joint.

14. The plate-and-fin heat exchanger of claim 13, wherein a thickness of the braze joint is measured from a crest of one of the plurality of bending points and a surface of a respective core plate a respective fin is secured to.

15. The plate-and-fin heat exchanger of claim 10, wherein the plate-and-fin heat exchanger is a charge air cooler for the vehicle.

16. The plate-and-fin heat exchanger of claim 13, wherein the braze joint defines a thickness of less than a hundred micrometers.

17. The plate-and-fin heat exchanger of claim 13, wherein the braze joint is constructed of one or more of the following: an aluminum silicon (Al—Si) alloy, stainless steel, brass, copper, copper-silver alloys, nickel, and nickel-based alloys.

18. The plate-and-fin heat exchanger of claim 10, wherein an outer surface of the plurality of fins includes a surface roughness average ranging from about two micrometers to about seven micrometers.

19. The plate-and-fin heat exchanger of claim 10, wherein the passageway is defined by opposing surfaces of the pair of core plates.

20. The plate-and-fin heat exchanger of claim 19, wherein the opposing surfaces of both of the pair of core plates include a surface roughness average ranging from about two micrometers to about seven micrometers.

* * * * *